(12) United States Patent
Gally et al.

(10) Patent No.: US 8,085,461 B2
(45) Date of Patent: Dec. 27, 2011

(54) SYSTEMS AND METHODS OF ACTUATING MEMS DISPLAY ELEMENTS

(75) Inventors: Brian J. Gally, Los Gatos, CA (US); William J. Cummings, Millbrae, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 7 days.

(21) Appl. No.: 12/467,130

(22) Filed: May 15, 2009

(65) Prior Publication Data

US 2009/0219600 A1 Sep. 3, 2009

Related U.S. Application Data

(62) Division of application No. 11/228,118, filed on Sep. 16, 2005, now Pat. No. 7,545,550.

(60) Provisional application No. 60/613,319, filed on Sep. 27, 2004.

(51) Int. Cl.
G02B 26/00 (2006.01)
(52) U.S. Cl. ...................................................... 359/290
(58) Field of Classification Search .................. 359/245, 359/267, 290, 291, 292, 223, 224
See application file for complete search history.

(56) References Cited

U.S. PATENT DOCUMENTS

| | | |
|---|---|---|
| 4,672,327 A | 6/1987 | Wittlinger |
| 4,709,995 A | 12/1987 | Kuribayashi et al. |
| 4,954,789 A | 9/1990 | Sampsell |
| 5,055,833 A | 10/1991 | Hehlen et al. |
| 5,227,900 A | 7/1993 | Inaba et al. |

(Continued)

FOREIGN PATENT DOCUMENTS
EP 0 295 802 12/1988
(Continued)

OTHER PUBLICATIONS

Examiner's Report dated Aug. 13, 2009 in Australian App. No. 2005289695.

(Continued)

*Primary Examiner* — Scott J Sugarman
*Assistant Examiner* — Tuyen Tra
(74) *Attorney, Agent, or Firm* — Knobbe, Martens, Olson & Bear, LLP

(57) ABSTRACT

Apparatus and methods of actuating MEMS display elements are disclosed. The disclosed embodiments can be incorporated into other drive schemes for MEMS display elements. In one embodiment, an apparatus for controlling a MEMS display element to display a frame of video data, said MEMS display element comprising a portion of an array of MEMS display elements, includes an array controller configured to assert a potential difference on said MEMS display element during a first portion of a frame display write process to place the MEMS display element in a first display state, and to assert a potential difference on said MEMS display element during a second portion of the frame display write process to place the MEMS display element in a second display state to display the frame of the video data, where the first display state is different from the second display state. In another embodiment, an array controller asserts a large potential difference across a MEMS display element to affect charge build up and an offset voltage level. In another embodiment, an array controller asserts a series of pulses to rapidly switch the MEMS display element between states to overcome adverse conditions that may affect the operation of the MEMS display element.

29 Claims, 13 Drawing Sheets

U.S. PATENT DOCUMENTS

| | | | |
|---|---|---|---|
| 5,285,196 | A | 2/1994 | Gale |
| 5,699,075 | A | 12/1997 | Miyamoto |
| 5,754,160 | A | 5/1998 | Shimizu et al. |
| 5,771,116 | A | 6/1998 | Miller et al. |
| 5,784,189 | A | 7/1998 | Bozler et al. |
| 5,828,367 | A | 10/1998 | Kuga |
| 5,912,758 | A | 6/1999 | Knipe et al. |
| 6,040,937 | A | 3/2000 | Miles |
| 6,055,090 | A | 4/2000 | Miles |
| 6,201,633 | B1 * | 3/2001 | Peeters et al. ............. 359/296 |
| 6,263,146 | B1 | 7/2001 | Umeno et al. |
| 6,327,071 | B1 | 12/2001 | Kimura |
| 6,356,254 | B1 | 3/2002 | Kimura |
| 6,507,330 | B1 | 1/2003 | Handschy et al. |
| 6,507,331 | B1 | 1/2003 | Schlangen et al. |
| 6,545,495 | B2 | 4/2003 | Warmack et al. |
| 6,574,033 | B1 | 6/2003 | Chui et al. |
| 6,593,934 | B1 | 7/2003 | Liaw et al. |
| 6,636,187 | B2 | 10/2003 | Tajima et al. |
| 6,674,562 | B1 | 1/2004 | Miles et al. |
| 6,680,792 | B2 | 1/2004 | Miles |
| 6,762,873 | B1 | 7/2004 | Coker et al. |
| 6,798,561 | B2 | 9/2004 | Huibers |
| 6,940,285 | B2 | 9/2005 | Montrose et al. |
| 6,950,222 | B2 | 9/2005 | Ibe et al. |
| 7,034,783 | B2 | 4/2006 | Gates et al. |
| 7,110,158 | B2 * | 9/2006 | Miles ............................ 359/291 |
| 7,123,216 | B1 | 10/2006 | Miles |
| 7,161,728 | B2 | 1/2007 | Sampsell et al. |
| 7,274,347 | B2 | 9/2007 | Richards |
| 7,348,946 | B2 | 3/2008 | Booth et al. |
| 7,400,489 | B2 | 7/2008 | Van Brocklin et al. |
| 7,499,208 | B2 | 3/2009 | Mignard |
| 7,515,147 | B2 | 4/2009 | Mignard |
| 7,545,550 | B2 | 6/2009 | Gally et al. |
| 7,551,159 | B2 * | 6/2009 | Mignard et al. ............. 345/108 |
| 7,560,299 | B2 | 7/2009 | Cummings |
| 2001/0026250 | A1 | 10/2001 | Inoue et al. |
| 2001/0034075 | A1 | 10/2001 | Onoya |
| 2001/0040536 | A1 | 11/2001 | Tajima et al. |
| 2001/0052887 | A1 | 12/2001 | Tsutsui et al. |
| 2002/0012159 | A1 | 1/2002 | Tew |
| 2002/0030674 | A1 | 3/2002 | Shigeta |
| 2002/0093722 | A1 | 7/2002 | Chan et al. |
| 2002/0126364 | A1 | 9/2002 | Miles |
| 2002/0140685 | A1 | 10/2002 | Yamamoto et al. |
| 2002/0181070 | A1 | 12/2002 | Hewlett |
| 2003/0020699 | A1 | 1/2003 | Nakatani et al. |
| 2003/0122773 | A1 | 7/2003 | Washio et al. |
| 2003/0137215 | A1 | 7/2003 | Cabuz |
| 2003/0137521 | A1 | 7/2003 | Zehner et al. |
| 2003/0142043 | A1 | 7/2003 | Matsueda |
| 2003/0179172 | A1 | 9/2003 | Miyachi |
| 2003/0189536 | A1 | 10/2003 | Ruigt |
| 2003/0201777 | A1 | 10/2003 | Gogoi et al. |
| 2004/0021658 | A1 | 2/2004 | Chen |
| 2004/0070400 | A1 | 4/2004 | van Spengen |
| 2004/0114210 | A1 | 6/2004 | Fitzpatrick et al. |
| 2004/0136596 | A1 | 7/2004 | Oneda et al. |
| 2004/0141224 | A1 * | 7/2004 | Huibers ........................ 359/291 |
| 2004/0145553 | A1 | 7/2004 | Sala et al. |
| 2005/0024301 | A1 | 2/2005 | Funston |
| 2005/0152015 | A1 | 7/2005 | Anderson et al. |
| 2005/0152022 | A1 * | 7/2005 | Honeyman et al. ........... 359/296 |
| 2006/0007249 | A1 | 1/2006 | Reddy et al. |
| 2006/0066553 | A1 | 3/2006 | Deane |
| 2006/0250350 | A1 | 11/2006 | Kothari et al. |

FOREIGN PATENT DOCUMENTS

| | | |
|---|---|---|
| EP | 0 300 754 | 1/1989 |
| EP | 0 417 523 | 3/1991 |
| EP | 0 467 048 | 1/1992 |
| EP | 0 911 794 | 4/1999 |
| EP | 1 134 721 | 9/2001 |
| EP | 1 239 448 | 9/2002 |
| EP | 1 280 129 | 1/2003 |
| EP | 1 414 011 | 4/2004 |
| JP | 2000-075963 | 4/2000 |
| JP | 2000-221543 | 8/2000 |
| WO | WO 02/089103 | 11/2002 |
| WO | WO 03/007049 | 1/2003 |
| WO | WO 03/079323 | 9/2003 |
| WO | WO 03/103013 | 12/2003 |
| WO | WO 2004/054088 | 6/2004 |

OTHER PUBLICATIONS

Official Communication dated Jan. 19, 2010 in European App. No. 05797808.2.
Chen et al., Low peak current driving scheme for passive matrix-OLED, SID International Symposium Digest of Technical Papers, May 2003, pp. 504-507.
Miles, MEMS-based interferometric modulator for display applications, Part of the SPIE Conference on Micromachined Devices and Components, vol. 3876, pp. 20-28 (1999).
Miles et al., 5.3: Digital Paper™: Reflective displays using interferometric modulation, SID Digest, vol. XXXI, 2000 pp. 32-35.
Office Action dated Aug. 22, 2008 in U.S. App. No. 11/218,887.
IPRP for PCT/US05/034296 filed Sep. 23, 2005.
ISR and WO for PCT/US05/034296 filed Sep. 23, 2005.
IPRP for PCT/US05/034198 filed Sep. 23, 2005.
Invitation to Pay Additional Fees for PCT/US05/034198 filed Sep. 23, 2005.
First Office Action dated Apr. 11, 2008 in Chinese App. No. 200580031458.2.
Office Action dated Jan. 29, 2008 in U.S. Appl. No. 11/218,887.
Office Action dated Mar. 24, 2009 in U.S. Appl. No. 11/218,887.
Office Action dated Apr. 20, 2007 in U.S. Appl. No. 11/228,118.
Office Action dated Oct. 10, 2007 in U.S. Appl. No. 11/228,118.
Office Action dated Oct. 22, 2008 in U.S. Appl. No. 11/228,118.
ISR and WO for PCT/US05/034198 filed Sep. 23, 2005.
Office Action dated Oct. 10, 2008 in Chinese App. No. 200580031458.2.
Office Action dated Mar. 27, 2009 in Chinese App. No. 200580031458.2.
Official Communication dated Aug. 4, 2009 in European App. No. 05801445.7.
Final Notice of Rejection dated Apr. 5, 2011 in Japanese App. No. 2007-533662.
Notice of Reasons for Rejection dated Dec. 14, 2010 in Japanese App. No. 2007-533662.

* cited by examiner

SYSTEMS AND METHODS OF ACTUATING MEMS DISPLAY ELEMENTS

RELATED APPLICATIONS

This application is a divisional of U.S. patent application Ser. No. 11/228,118, filed Sep. 16, 2005, entitled "SYSTEMS AND METHODS OF ACTUATING MEMS DISPLAY ELEMENTS," issued as U.S. Pat. No. 7,545,550, which claims the benefit of U.S. Provisional Patent Application 60/613,319 filed on Sep. 27, 2004, both of which applications are hereby incorporated by reference in their entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a movable metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

In one embodiment, a display apparatus comprises a plurality of MEMS display elements, and an array controller configured to apply a first potential to at least some of the MEMS display elements during a first portion of an image data write process, said first potential corresponding to a first display state, and apply a second potential to at least some of the MEMS display elements during a second portion of the image data write process, said second potential corresponding to a second different display state, wherein at least a portion of the image data is displayed by the MEMS display elements that are in the second state.

In another embodiment, a method of displaying at least some image data on an array of MEMS display elements, each element having an actuated state and a relaxed state, wherein said image data defines a first set of relaxed display elements and a second set of actuated display elements comprises applying an actuating potential to said first set of display elements, applying a relaxing potential to said second set of display elements, applying a relaxing potential to said first set of display elements to display said image data on said first set of display elements, and applying an actuating potential to said second set of display elements to display said image data on said second set of display elements.

In another embodiment, a method of displaying at least a portion of a frame of image data on at least one of a plurality of MEMS display elements comprises placing at least one MEMS display element in a first display state during a first portion of an image data write process, and placing said at least one MEMS display element in a second different display state during a second portion of said image data write process to display said portion of a frame of image data, where said portion of a frame of image data is displayed when said at least one MEMS display element is in said second display state.

In another embodiment, a display apparatus comprises means for modulating light to display at least a portion of an image, means for applying a first potential to the modulating means during a first portion of an image data write process, said first potential corresponding to a first display state, and means for applying a second potential to the modulating means during a second portion of the image data write process, said second potential corresponding to a second different display state, where the portion of the image is displayed when the modulating means is in the second state.

In another embodiment, a method of operating a MEMS display element, said MEMS display element displaying bistability arising from a hysteresis curve having actuation and relaxation portions comprises producing a shift of said hysteresis curve by applying a series of actuation voltages to said MEMS display element during operation of a display incorporating said MEMS display element, and applying a restoring voltage to said MEMS display element, said restoring voltage having a magnitude larger than said series of actuation voltages and being sufficient to reduce said shift of said hysteresis curve.

In another embodiment, a display apparatus comprises at least one MEMS display element, and an array controller coupled to said at least one MEMS display element, said array controller configured to apply an AC voltage signal with a frequency higher than 1/T to said at least one MEMS display element, where T is a characteristic response time for said at least one MEMS display element to change from a first display state to a second display state.

In another embodiment, a method of freeing a stuck MEMS display element comprises applying an AC voltage signal with a frequency higher than 1/T to said MEMS display element, where T is a response time for said at least one MEMS display element to change from a first display state to a second display state.

In another embodiment, a method of driving an array of MEMS display elements comprising writing frames of data to said array at a frame update rate, applying an AC voltage signal to at least one of said MEMS display elements, said AC voltage signal having a frequency higher than 1/T, where T is a response time for said at least one MEMS display element to change from a first display state to a second display state, wherein said voltage signal is applied to said MEMS display element at a repetition rate lower than the frame rate.

In another embodiment, a display apparatus comprises means for modulating light, said modulating means comprising a movable light modulating element susceptible to becoming stuck in a display state, and means for applying a voltage on said modulating means, said applying means configured to assert an AC voltage with a frequency higher than 1/T, where T is a characteristic response time for said modulating means to change from a first display state to a second display state.

In another embodiment, a display apparatus comprises at least one MEMS display element displaying bistability arising from a hysteresis curve having actuation and relaxation portions, an array controller configured to produce a shift of said hysteresis curve by applying a series of actuation voltages to said MEMS display element during operation of a display incorporating said MEMS display element, and applying a restoring voltage to said MEMS display element, said restoring voltage having a magnitude larger than said series of actuation voltages and being sufficient to reduce said shift of said hysteresis curve.

In another embodiment, a display apparatus comprises a means for modulating light in a display, said modulating means displaying bistability arising from a hysteresis curve having actuation and relaxation portions, means for applying a series of actuation voltages to said modulating means to produce a shift of said hysteresis curve during operation of said display incorporating said modulating means, and means for applying a restoring voltage to said modulating means, said restoring voltage having a magnitude larger than said series of actuation voltages and being sufficient to reduce said shift of said hysteresis curve.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figures 3, 4:
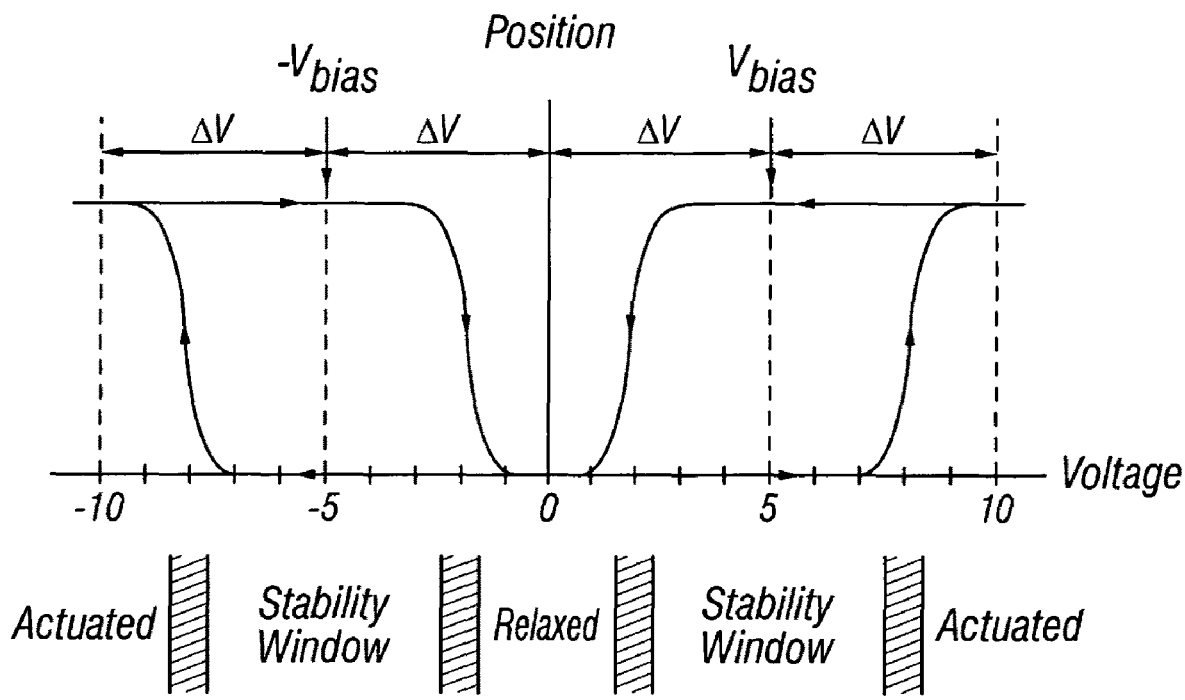
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

It is one aspect of a MEMS device that charge can build on the dielectric between the layers of the device, especially when the devices are actuated and held in the actuated state by an electric field that is always in the same direction. For example, if the moving layer is always at a higher potential relative to the fixed layer when the device is actuated, a slowly increasing charge buildup on the dielectric can begin to shift a hysteresis curve for the device such that the hysteresis curve is not centered on the desired voltage, e.g., the offset voltage on which the hysteresis curve is centered is changed from its designed value. Note, for example, that the stability windows of FIG. 3 are centered around zero volts, which would be the case for an idealized uncharged device. However, if charge builds up on the dielectric inside the MEMS element, both stability windows will shift together to the left or right, depending on the polarity of the charge. This is undesirable as it causes display performance to change over time. Furthermore, this shift can be different for different pixels as image content typically requires pixels to be actuated differently. In one aspect of this invention, a large potential difference (e.g., a voltage pulse) can be periodically asserted on the MEMS device to remove or reduce the charge build-up and maintain the offset voltage at a desired level. This large voltage pulse can have either a negative or positive polarity, or a series of pulses of both polarities, and can be asserted according to a periodic time interval or based on the occurrence of an event, for example, start up, shut down, a diagnostic condition, or input received from a user.

It is another aspect of a MEMS device that the light modulating element can become stuck in one of the modulating positions. For the interferometric modulators described herein, a movable reflective plate can become stuck when it is placed in contact with a dielectric stack on the stationary reflective plate (an actuated position), especially when left in that position for significant periods of time. In an aspect of this invention, a series of potential differences are asserted across the MEMS device to "shake" loose the stuck movable reflective plate. In some embodiments, the series of potential differences are applied at a frequency that is higher than a normal refresh rate frequency, and can be at or about the resonant frequency of the MEMS device. The series of potential differences, which is sometimes referred to herein as a "resonant pulse," can be asserted according to a periodic time interval that is slower than the refresh rate of the device, or asserted based on the occurrence of an event, for example, start up, shut down, a diagnostic condition, or input from a user It is a another aspect of a MEMS device that its light modulating movable element is more likely to respond to an asserted voltage in a predictable manner when the MEMS device is periodically or even frequently toggled between its actuated and relaxed state. In particular, in the interferometric light modulators described herein, periodic toggling between states can prevent the movable reflective plate from becoming stuck by minimizing the time it remains in an actuated state. It is an aspect of this invention that a drive voltage is asserted on a MEMS device to periodically toggle the light modulating element between an actuated and released state even when updating the displayed image data does not require a change in state. In one embodiment, the MEMS device is toggled by first changing the MEMS device to attain the opposite state required to display the desired frame of image data and then toggling the MEMS device to the desired state to display the image data, thus changing the state of the MEMS device at least once no matter what state is required to display the image data.

Figure 1:
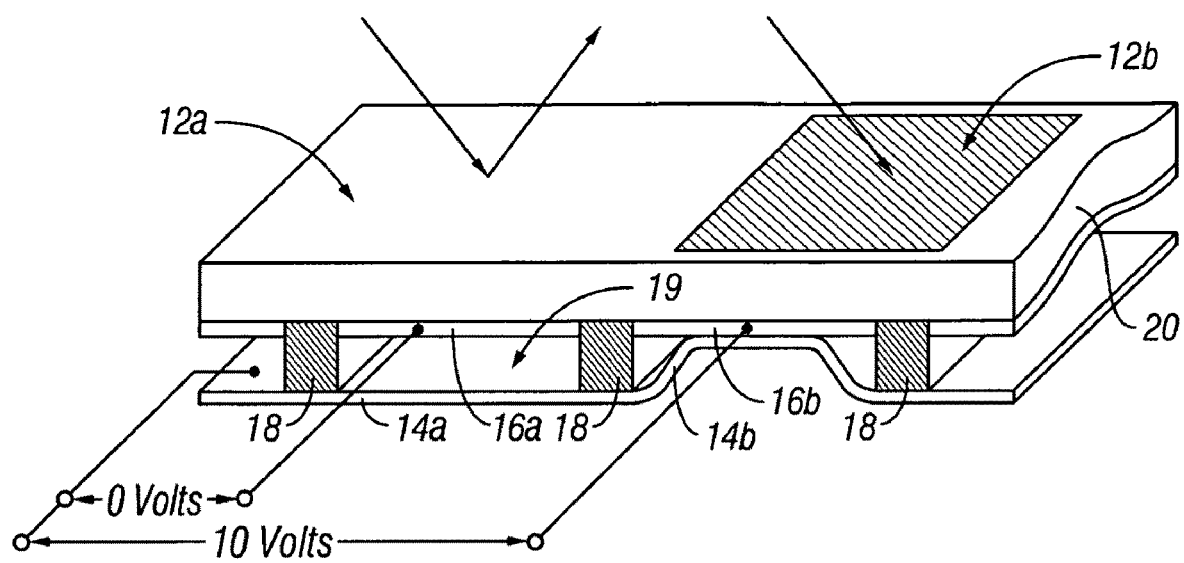
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
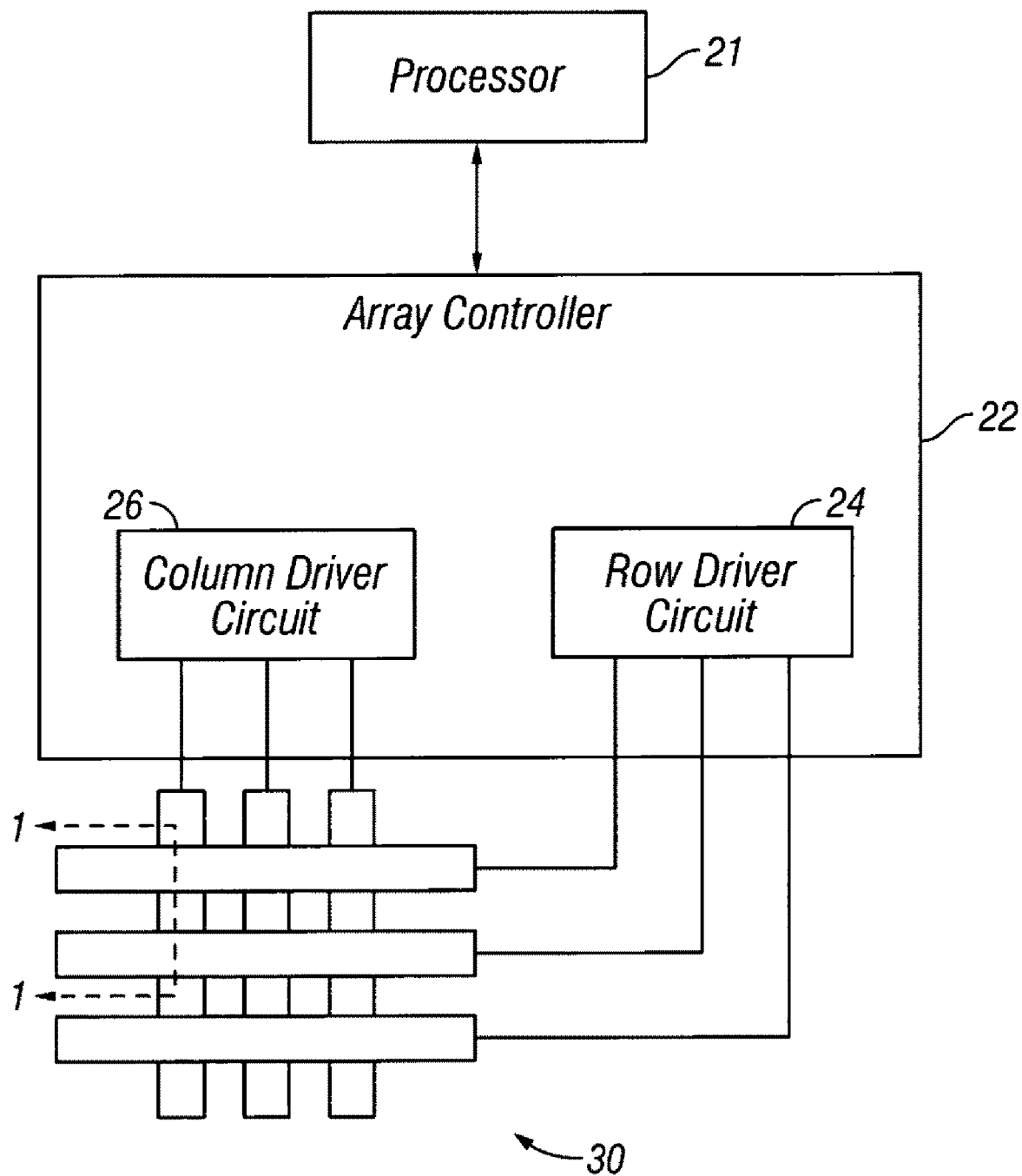
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, PentiumII®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
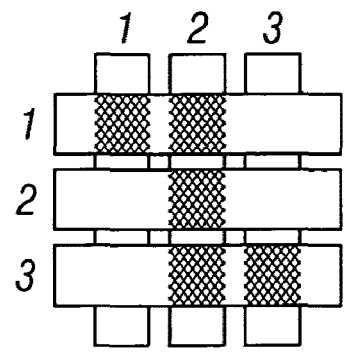
FIGS. 5A and 5B illustrate one exemplary timing diagram for row and column signals that may be used to write a frame of display data to the 3×3 interferometric modulator display of FIG. 2.
Figure 5B:
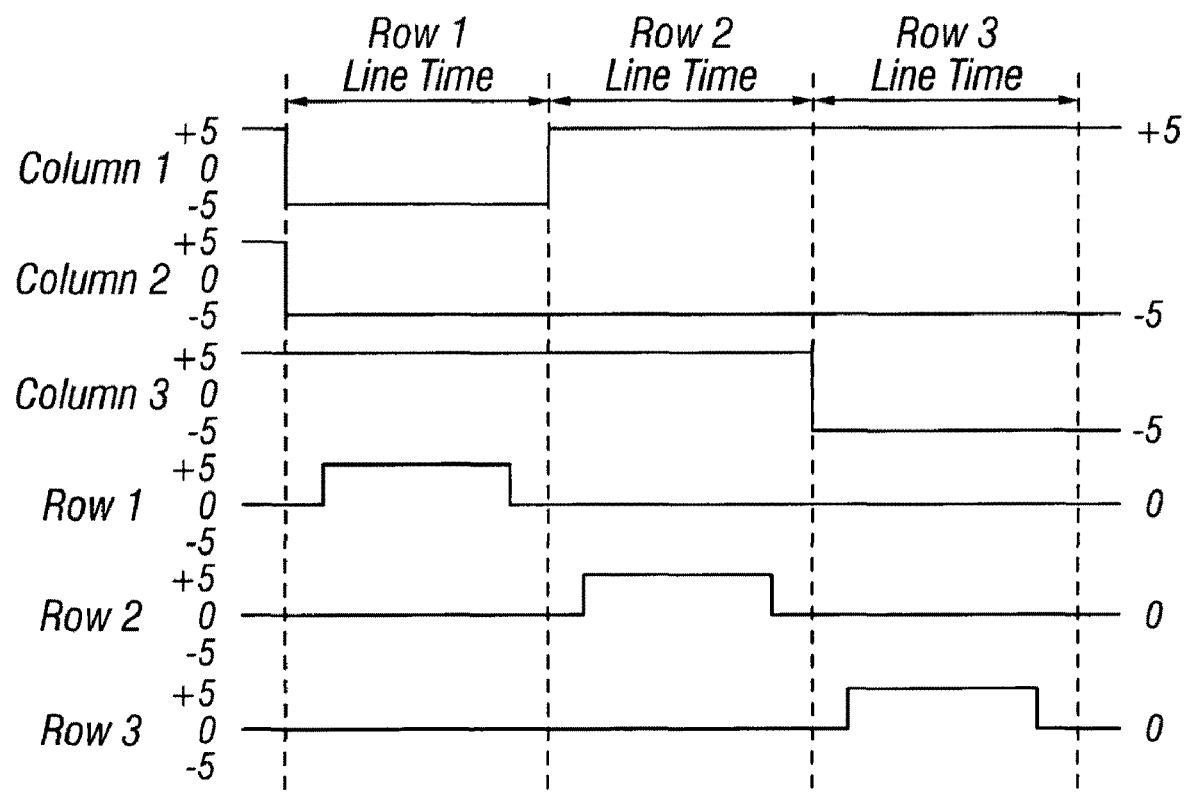

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
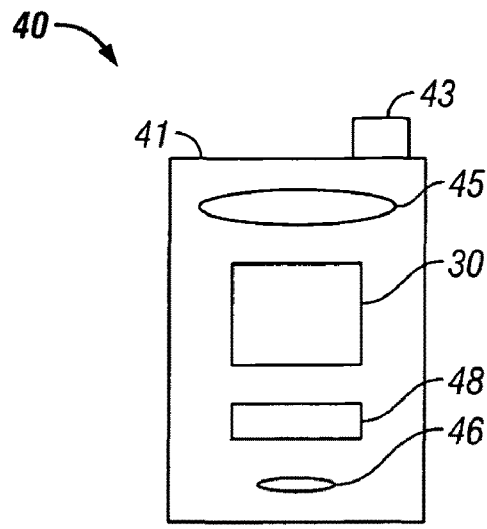
FIGS. 6A and 6B are system block diagrams illustrating an embodiment of a visual display device comprising a plurality of interferometric modulators.
Figure 6B:
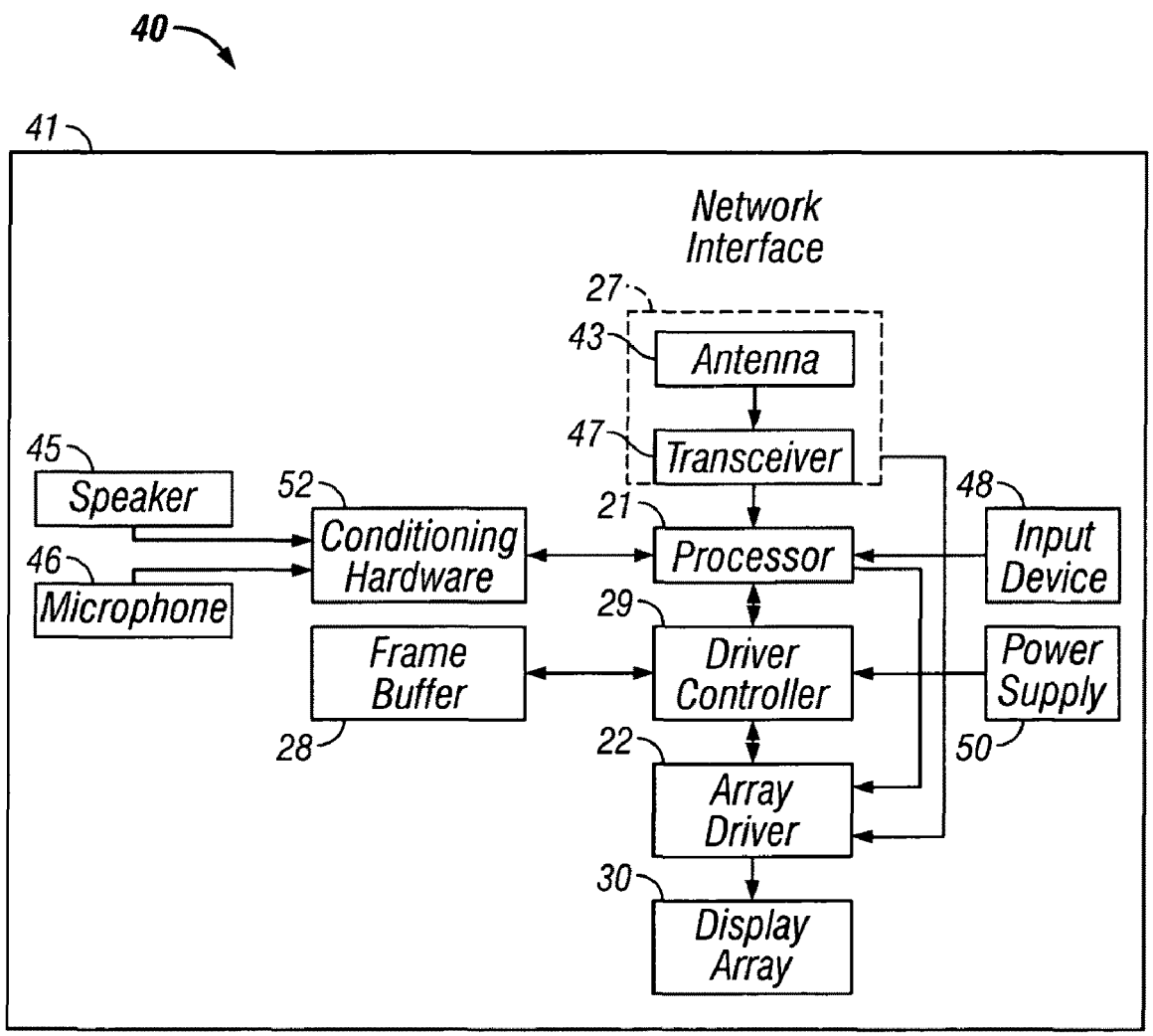

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
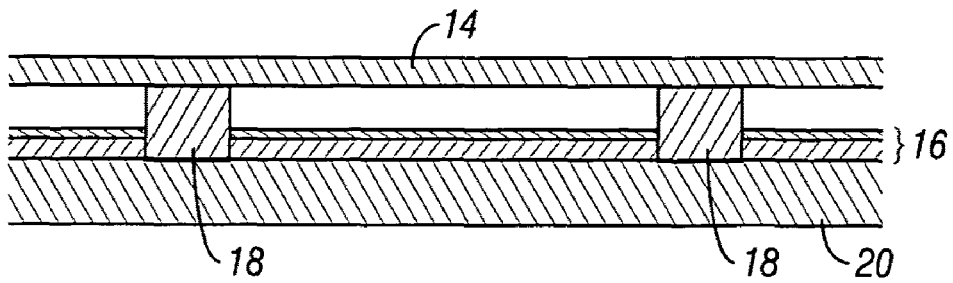
FIG. 7A is a cross section of the device of FIG. 1.
Figure 7B:
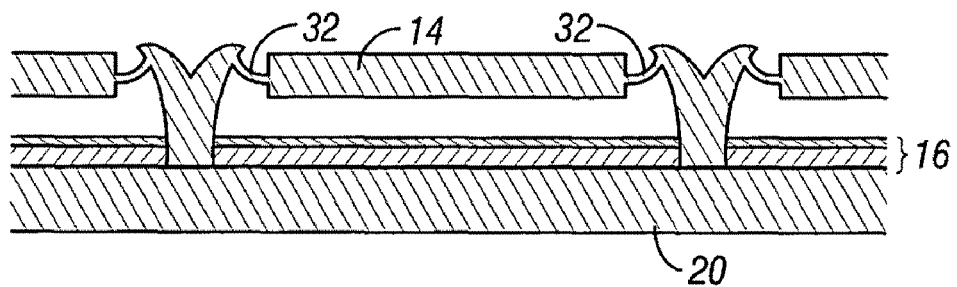
FIG. 7B is a cross section of an alternative embodiment of an interferometric modulator.
Figure 7C:
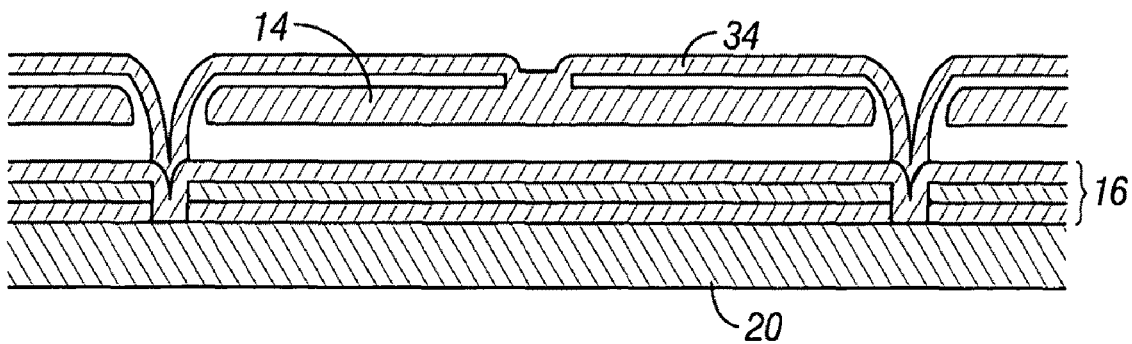
FIG. 7C is a cross section of another alternative embodiment of an interferometric modulator.
Figure 7D:
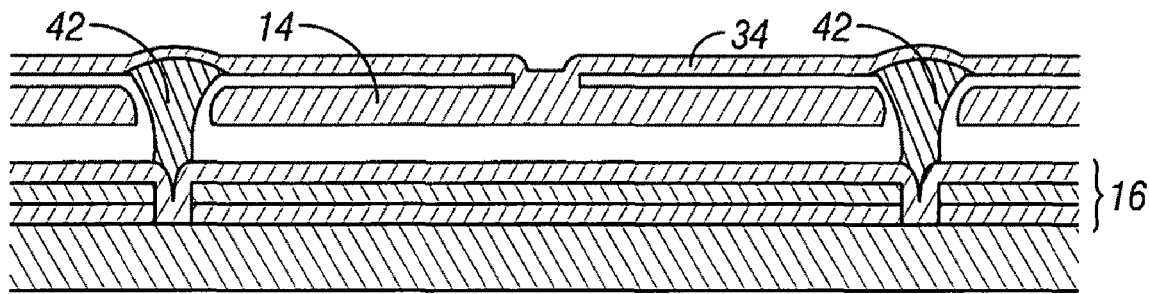
FIG. 7D is a cross section of yet another alternative embodiment of an interferometric modulator.
Figure 7E:
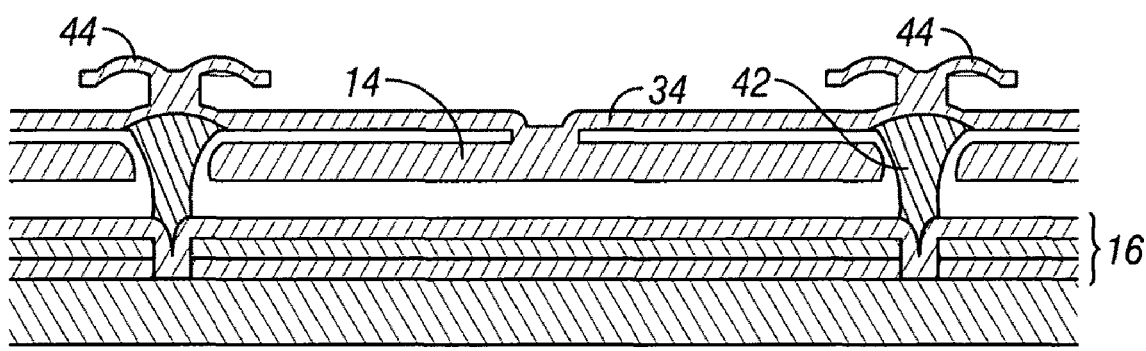
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

It is one aspect of the above described devices that charge can build on the dielectric between the layers of the device, especially when the devices are actuated and held in the actuated state by an electric field that is always in the same direction. For example, if the moving layer is always at a higher potential relative to the fixed layer when the device is actuated by potentials having a magnitude larger than the outer threshold of stability, a slowly increasing charge buildup on the dielectric can begin to shift the hysteresis curve for the device. This is undesirable as it causes display performance to change over time. As illustrated in the example of FIG. 5B, a given pixel sees a 10 volt difference during actuation, and every time in this example, the row electrode is at a 10 V higher potential than the column electrode. During actuation, the electric field between the plates therefore always points in one direction, from the row electrode toward the column electrode.

Figure 8A:
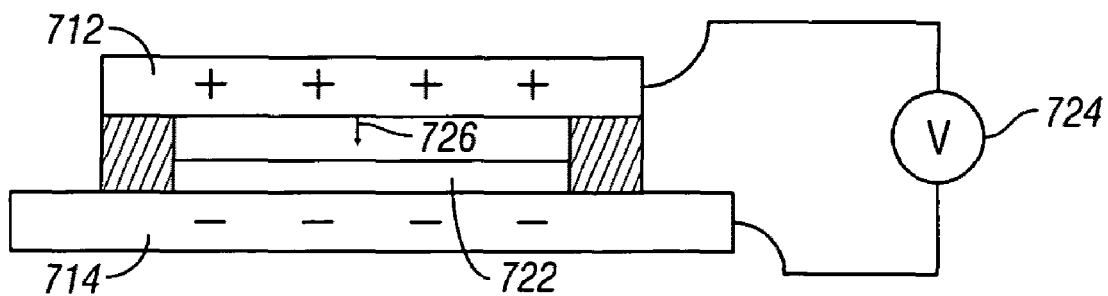
FIGS. 8A, 8B, and 8C are schematic side views of an interferometric modulator illustrating the process of embedding a charge in the dielectric layer of the interferometric modulator.
Figure 8B:
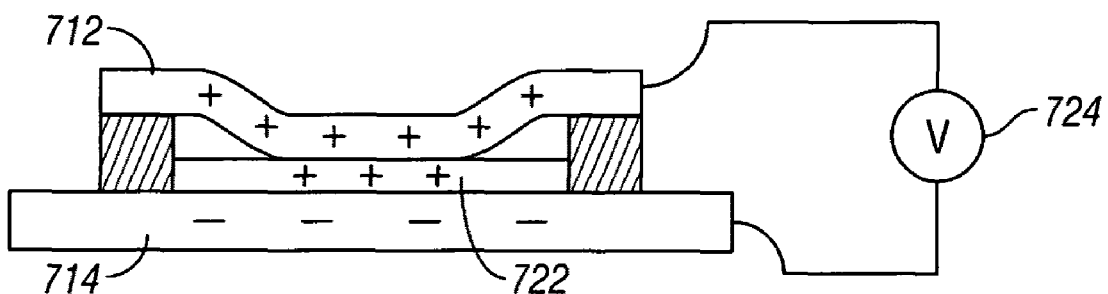
Figure 8C:
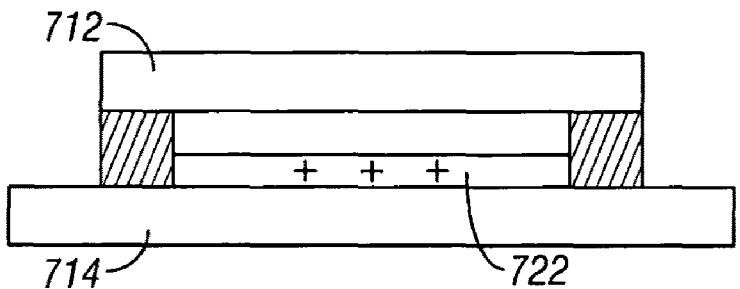

FIGS. 8A, 8B, and 8C show a side cross-sectional view of an interferometric modulator with structure similar to the device shown in FIG. 7A. These figures illustrate the application of a voltage from the voltage source 724 across the reflective layer 712 and the optical stack 714. In FIG. 8B, the reflective layer 712 is illustrated in its actuated state, where it is drawn closer to the optical stack 722 by an electrostatic force produced by the applied voltage. As shown in FIG. 8B, as reflective layer 712 contacts or becomes sufficiently close to the dielectric stack 722, it transfers electrical charge to the dielectric stack 722. FIG. 8C shows the device when the electrical potential induced by the voltage source 724 is removed or reduced such that the reflective layer 712 returns to its relaxed state. However, it is also seen that the dielectric stack 722 still holds some or all of the electrical charge that was transferred to it when the reflective layer 712 was actuated and brought into contact or near contact with the dielectric stack 722. As shown in FIG. 8C, the transferred charge is a positive charge. If actuated with a potential of opposite polarity then the transferred charge would be negative.

The property by which the dielectric stack holds the charge can be referred to as "charge persistence." When a dielectric stack is holding a charge, that charge may be referred to as an "embedded charge."

The amount of charge that builds up during device operation can be reduced by actuating the MEMS display elements with a potential difference of a first polarity during a first portion of the display write process, and actuating the MEMS display elements with a potential difference having a polarity opposite the first polarity during a second portion of the display write process. This basic principle is illustrated in FIGS. 9, and 4-5.

Figure 9:
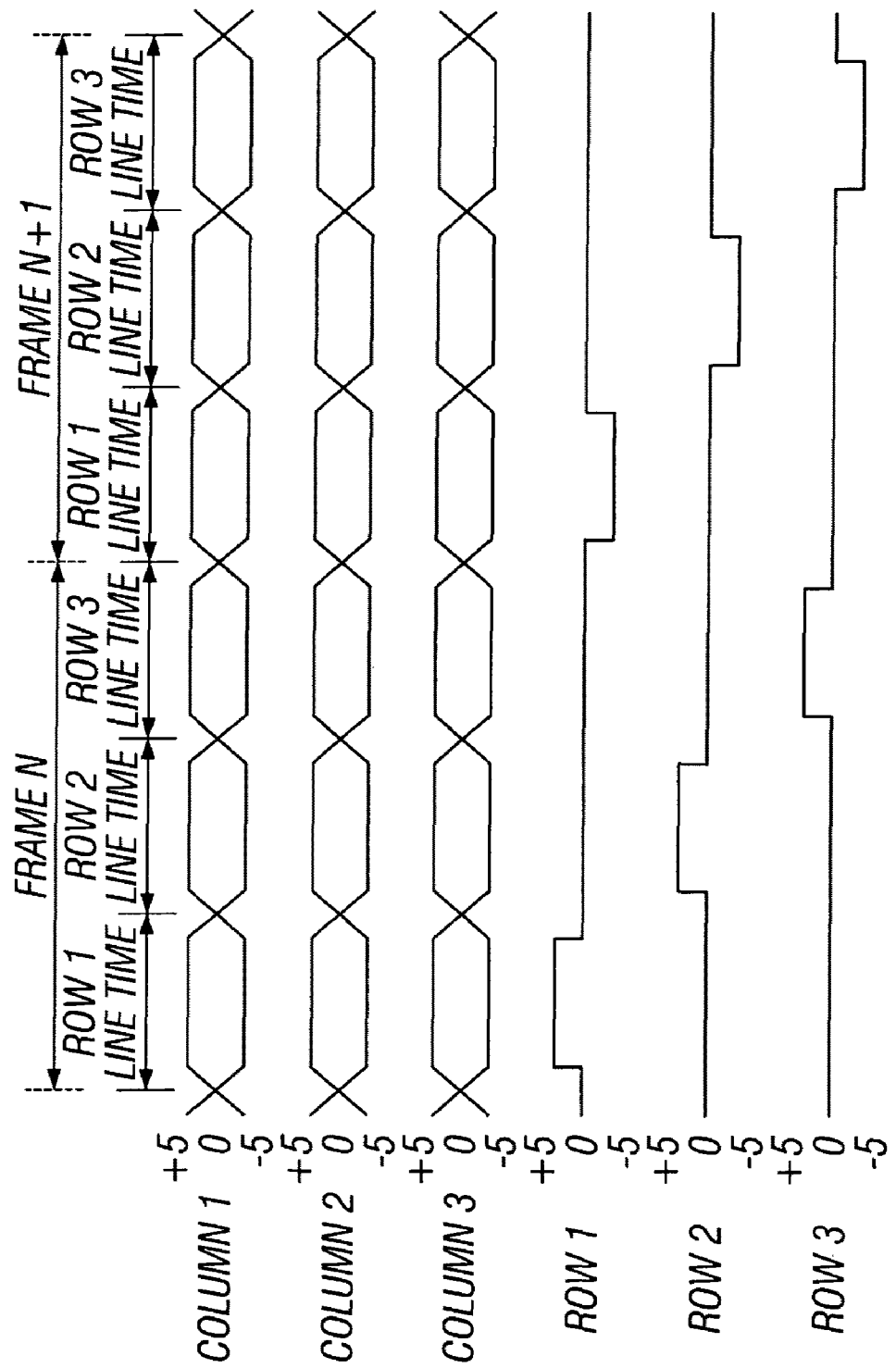
FIG. 9 is a waveform representation of the operation of a charge persistence interferometric modulator.

In FIG. 9, two frames of display data are written in sequence, frame N and frame N+1. The data for the columns goes valid for row 1 (e.g., either +5 V or −5 V depending on the desired state of the pixels in row 1) during the row 1 line time, valid for row 2 during the row 2 line time, and valid for row 3 during the row 3 line time. Frame N is written as shown in the second row of FIG. 4, which will be termed positive polarity herein, with the row electrode 10 V above the column electrode during MEMS device actuation. During actuation, the column electrode may be at −5 V, and the scan voltage on the row is +5 V in this example.

Frame N+1 is written in accordance with the third row of FIG. 4. For Frame N+1, the scan voltage is −5 V, and the column voltage is set to +5 V to actuate, and −5 V to relay. Thus, in Frame N+1, the column voltage is 10 V above the row voltage, termed a negative polarity herein. As the display is continually refreshed and/or updated, the polarity can be alternated between frames, with Frame N+2 being written in the same manner as Frame N, Frame N+3 written in the same manner as Frame N+1, and so on. In this way, actuation of pixels takes place in both polarities. In embodiments following this principle, potentials of opposite polarities are respectively applied to a given MEMS element at defined times and for defined time durations that depend on the rate at which image data is written to MEMS elements of the array, and the opposite potential differences are each applied an approximately equal amount of time over a given period of display use. This helps reduce charge buildup on the dielectric over time.

A wide variety of modifications of this scheme can be implemented. For example, Frame N and Frame N+1 can comprise different display data. Alternatively, it can be the same display data written twice to the array with opposite polarities. It can also be advantageous to dedicate some frames to setting the state of all or substantially all pixels to a relaxed state, and/or setting the state of all or substantially all the pixels to an actuated state prior to writing desired display data. Setting all the pixels to a common state can be performed in a single row line time by, for example, setting all the columns to +5 V (or −5 V) and scanning all the rows simultaneously with a −5 V scan (or +5 V scan).

In one such embodiment, desired display data is written to the array in one polarity, all the pixels are relaxed, and the same display data is written a second time with the opposite polarity. This is similar to the scheme illustrated in FIG. 9, with Frame N the same as Frame N+1, and with an array releasing line time inserted between the frames. In another embodiment, each display update of new display data is preceded by a releasing row line time.

In another embodiment, a row line time is used to actuate all the pixels of the array, a second line time is used to relax all the pixels of the array, and then the display data (Frame N for example) is written to the display. In this embodiment, Frame N+1 can be preceded by an array actuation line time and an array release line time of opposite polarities to the ones preceding Frame N, and then Frame N+1 can be written. In some embodiments, an actuation line time of one polarity, a release line time of the same polarity, an actuation line time of opposite polarity, and a release line time of opposite polarity can precede every frame. These embodiments ensure that all or substantially all pixels are actuated at least once for every frame of display data, reducing differential aging effects as well as reducing charge buildup.

It is also possible to perform these polarity reversals and actuation/relaxation protocols on a row by row basis. In these embodiments, each row of a frame may be written more than once during the frame writing process. For example, when writing row 1 of Frame N, the pixels of row 1 could all be relaxed, and the display data for row 1 can be written with positive polarity. The pixels of row 1 could be relaxed a second time, and the row 1 display data written again with negative polarity. Actuating all the pixels of row 1 as described above for the whole array could also be performed. It will further be appreciated that the relaxations and actuations described above may be performed at a lower frequency than every row write or every frame write during the display updating/refreshing process.

Figure 10A:
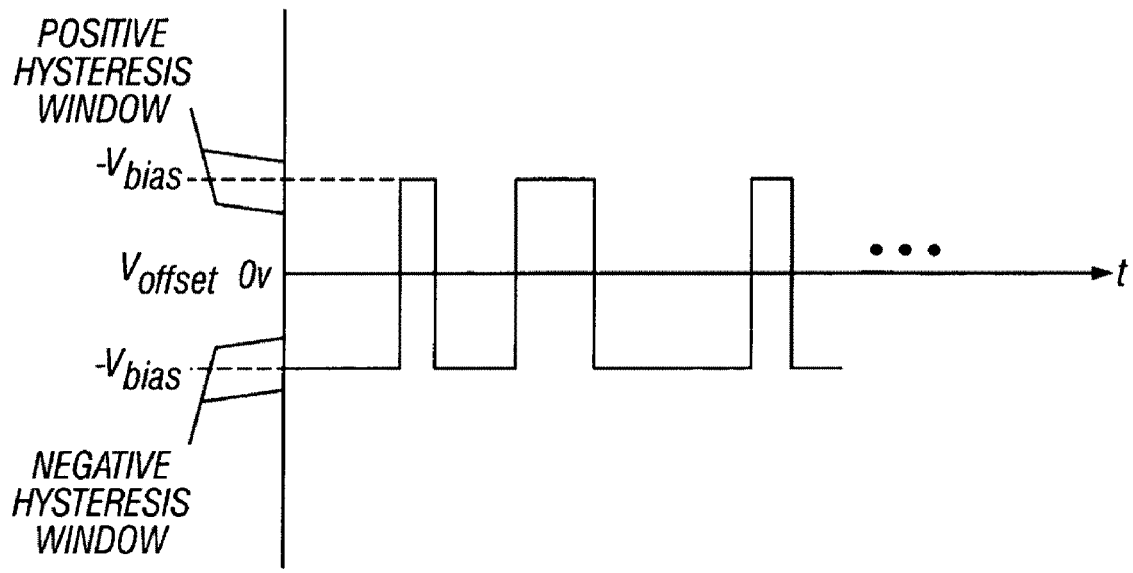
FIG. 10A is a graphical representation illustrating a positive and negative bias voltage centered around an offset voltage at zero volts.
Figure 10B:
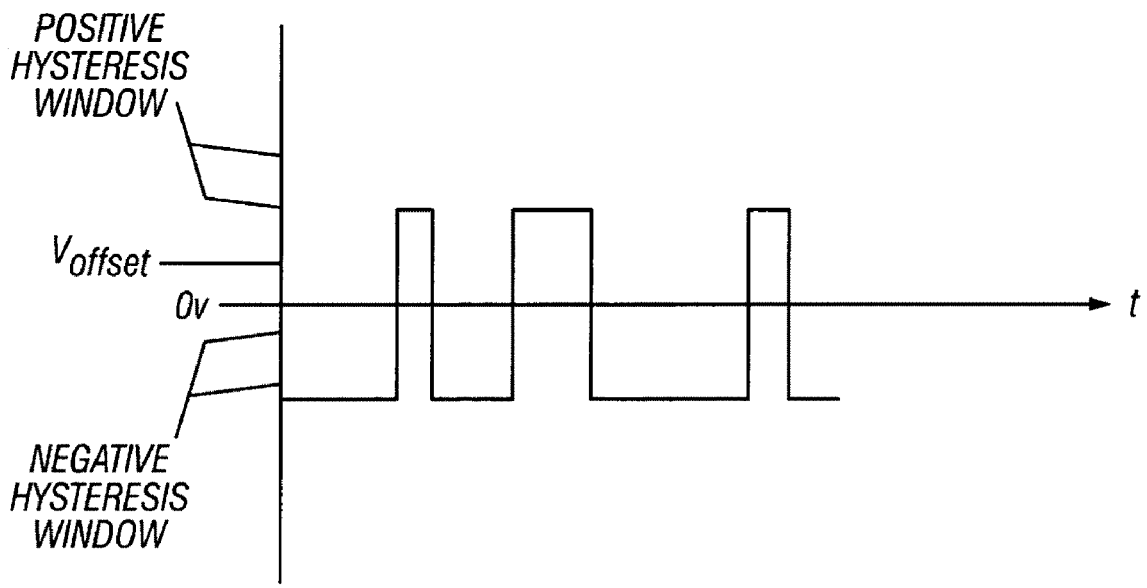
FIG. 10B is a graphical representation illustrating a positive and negative bias voltage centered around an offset voltage that is not at zero volts.

Even if the above described methods are used to minimize charge buildup, effects of charge buildup can still occur. For example, the hysteresis curve is normally centered around zero volts (as shown, for example, in FIG. 3), that is, the same potential, either positive (e.g. column higher than row) or negative (row higher than column) will deform the mechanical layer and actuate the MEMS element. See FIG. 10A also, for example. This Figure illustrates the voltage across a MEMS element switching between hysteresis windows on opposite sides of zero volts, which occurs in some array drive schemes during the write process. Note, that the hysteresis windows as shown in FIGS. 10A and 10B are the same as the stability windows shown in FIG. 3. If the device is charged, the hysteresis curve is shifted such that it is no longer symmetrical around zero. The degree of asymmetry can be referred to as the offset voltage of the device. The offset voltage is not necessarily zero, and can be affected by various factors, including the amount of fixed charge that can be inherent in a modulator due to, e.g., the materials used in fabricating the modulator and the fabrication process. The presence of an undesirable offset voltage (e.g., one caused by charge build up) can be a problem because the controller that applies the column/row voltages may no longer be applying the voltages necessary to reliably actuate and relax the MEMS device, e.g., a positive voltage application across the device that actuates the device when the device is uncharged may become insufficient to actuate the device later after charge build up during use. Furthermore, the bias voltage applied to the MEMS display elements by the array controller may start out within the hysteresis window, but drift outside of it during operation as the device accumulates charge, as illustrated in FIG. 10B. While the applied driving voltages remain fixed and are still symmetrical around 0 V, the actuation and release voltages have increased in the positive direction indicating a positive charge accumulated in the modulator. Accordingly, the hysteresis windows have also moved in a positive direction such that the applied bias voltage no longer falls within the hysteresis windows.

The effects of charge persisting on the dielectric stack can be alleviated. In some embodiments, this is done by applying voltages of selected amplitudes and polarities across the device in addition to the normal voltages that are applied during the write process. In some embodiments, this can be performed as a global action, meaning that it is applied over the entire array simultaneously. In other embodiments, it can be performed a row at a time. Advantageously, the duration of this process is short enough to be substantially imperceptible to a viewer. In some embodiments, the process lasts less than 10 milliseconds.

In one embodiment for controlling the offset voltage, an extra high actuation voltage, which can be referred to as a restoring potential difference, is used to restore the offset voltage to a desirable voltage level, typically near zero volts, by clearing any residual charge on the dielectric materials in the device. The restoring potential difference can have a positive or negative polarity. In one embodiment, all the MEMS elements in a row of the array can be written to such that all of the elements in the row end up in the actuated state using a row scan voltage of 7 V or 10 V instead of 5 V (with all the columns held at −5 V for example). This can be repeated periodically for all the rows of the array. If the controller is designed to be capable of simultaneous row output voltages, the entire array can be subjected to a desired voltage in a single line time by setting all the columns to one voltage and all the rows to a second voltage simultaneously. In these embodiments, the highest voltages applied to the pixel occur during these "over-actuation" row or array actuation times, and not during display data updates. Applied voltages can include, for example large amplitude (where large amplitude means greater than at least one normal write voltage used during display updates) positive or negative polarity pulses, either individually applied with relative large time periods between them, or in groups or sets of two or more pulses of either or both polarities, with a relatively long time period between the groups or sets. In this context, "relatively long time period" means greater than the characteristic time period between frame updates. Multiple cycles of a square wave AC waveform toggling between a large positive and negative potential may be used as a pulse set. Use of such an AC waveform can be referred to as an AC "wash". Different waveforms used to clear out the charge may have different advantages of effectiveness, depending in part on the specific characteristics of the dielectric stack.

In one specific example, during a frame write operation, the pixels of row 1 are scanned with a bipolar positive-then-negative large potential difference. The frame is then written normally. On the next frame, the pixels of row 2 are scanned with a bipolar positive-then-negative large potential difference prior to writing the frame. This may continue until all the rows have received the bipolar pulse. The method may continue by repeating the process with a negative-then-positive potential. After this, the process may repeat with the original positive-then-negative pulse. In other embodiments, the assertion of the restoring potential difference can be set to occur at the startup or shutdown of the device, or at another predetermined or dynamically determined time. In some embodiments, the restoring potential difference can be performed during the operation of the device as triggered either by the user, an automatic timing process or by a condition in the MEMS device itself, such as a diagnostic condition.

Another aspect of the invention includes a method of applying a voltage waveform which toggles the modulator to the opposite state while writing to that modulator, even if the modulator is to remain in the same state after the write operation is complete.

Figure 11A:
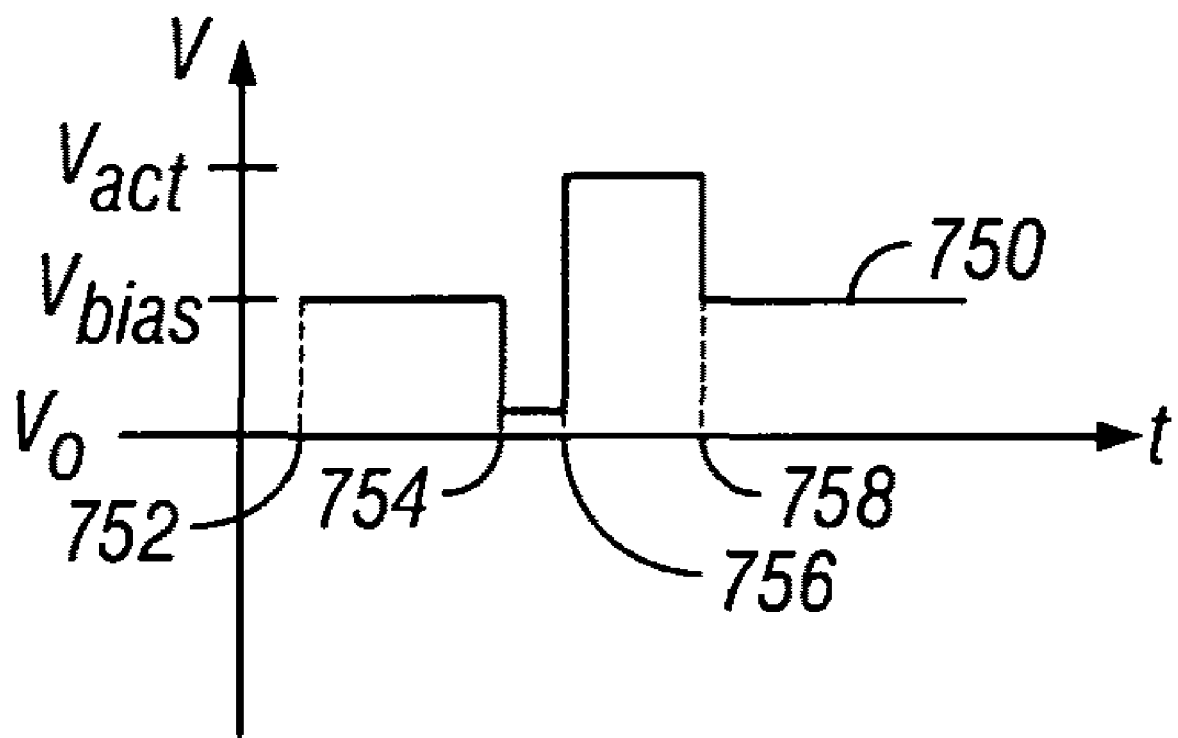
FIG. 11A is a graphical representation illustrating a driving voltage waveform that can be applied to the column electrode of an interferometric modulator.
Figure 11B:
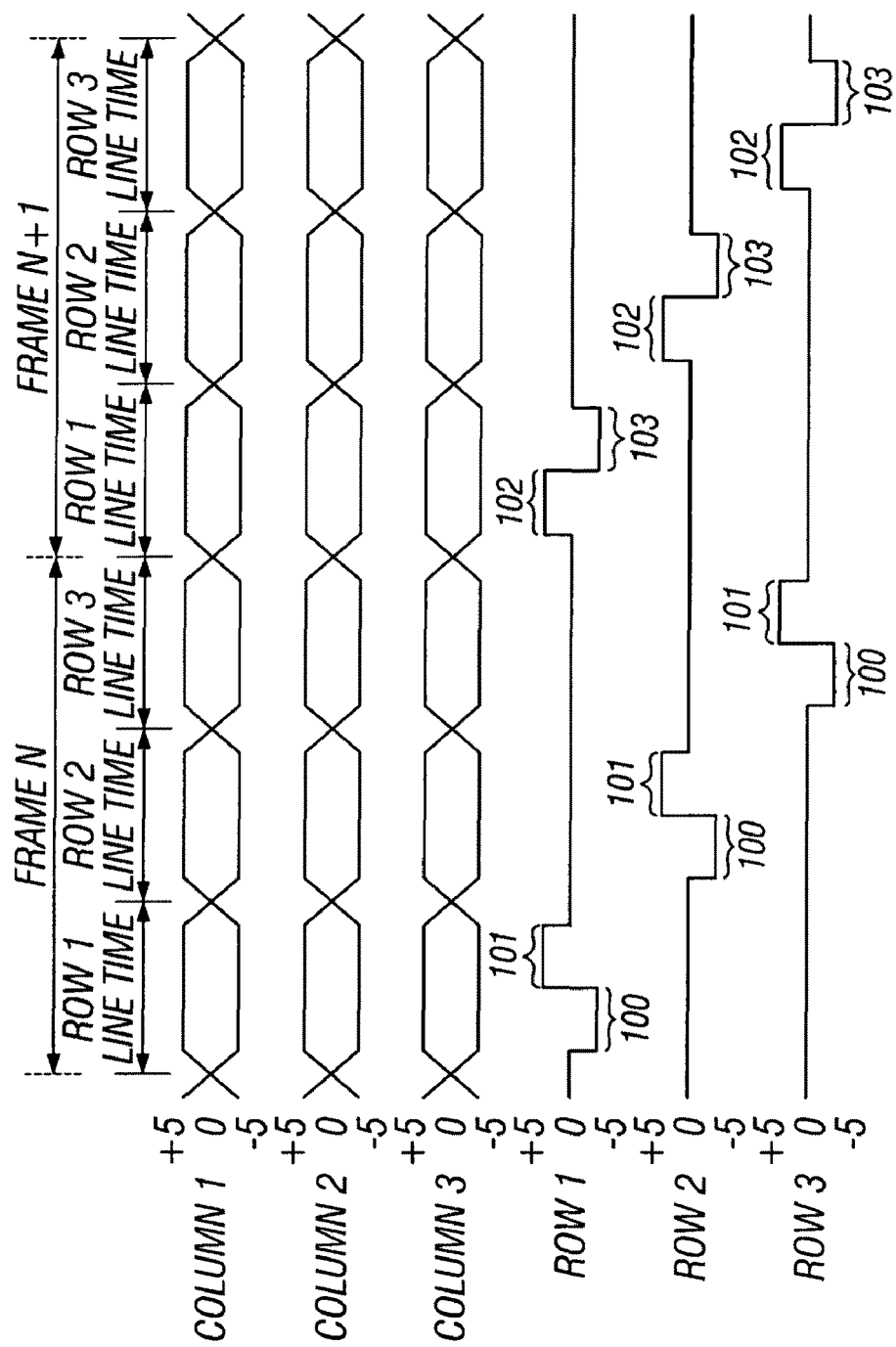
FIG. 11B is a graphical representation illustrating a driving voltage waveform in an exemplary timing diagram.

Referring now to FIG. 11A, trace 750 is an example of one embodiment of a voltage waveform across the MEMS device (e.g., the voltage difference between the row and column) that can be created in another drive scheme and used to toggle the interferometric modulator between an actuated and an unactuated state whether or not it needs change state to display the next frame of video data. Trace 750 illustrates the voltage across the modulator to perform a write to a modulator that is actuated before the write occurs and will also be actuated when the write is over. At state 752, the modulator is actuated. At state 754, the voltage curve 750 drops to the operational voltage required to release the modulator. Then, at state 756, the voltage curve 750 increases to again actuate the modulator. At state 758, the voltage curve drops down to the bias voltage to maintain the modulator at its current state. This method can be used during a write operation to toggle one or more modulators and then leave the modulators in the same state as before the write operation, thus helping to prevent their movable components from sticking in one state. As shown in FIG. 11B, toggling may be performed with every write cycle. In another embodiment, "toggling" is performed upon startup of the modulator. In another embodiment, the toggling is performed on a timed interval or periodic basis. In embodiments that include a display having rows MEMS display elements, the toggling can be done on a cascading row basis, for example, where one row (or a set of rows) is toggled, then the next row (or set of rows) is toggled, and repeated for all the desired rows. In another embodiment, the process is performed as a result of an input received by a user or by an automatic process, e.g., diagnostics. In some embodiments, toggling can be used to actuate MEMS device that are part of a display but not normally actuated.

FIG. 11B illustrates a row pulse that will produce the row-column activation and relax potential shown in FIG. 11A in a write process. In FIG. 11B, two frames of display data are written in sequence, Frame N and Frame N+1. The line row time illustrated in FIG. 11B is typically longer than the row line time illustrated in FIG. 10. For example, the line row time in FIG. 11B can be twice as long, and in any case is long enough so the modulators have enough time to respond to the each of the potentials of opposite polarity in the row pulse. In FIG. 11B, the data for the columns goes valid for row 1 (i.e., either +5 or −5 depending on the desired state of the pixels in row 1) during the row 1 line time, valid for row 2 during the row 2 line time, and valid for row 3 during the row 3 line time. The second row of FIG. 4 determines the final written state of Frame N, which will be termed positive polarity herein, with the row electrode 10 V above the column electrode during MEMS device actuation. Here the row pulse for Frame N includes a first portion 100 at −5 V and a second portion 101 at +5V, each of approximately the same duration. Applying the first portion 100 can cause an actuation or relaxation to occur, depending on the asserted voltage on the column electrode and the current state of the interferometric modulator. Then, applying the second portion 101 of +5 V causes each of the interferometric modulators subject to this voltage to change states. For example, if an interferometric modulator is in a relaxed state for the application of the first portion 100 it will be actuated by the second portion 101, and vice-versa. In this way, actuation of pixels using the row pulse shown in FIG. 11B takes place in both polarities. As a result of writing the first Frame N using the row pulse illustrated in FIG. 11B, every interferometric modulator subject to this row voltage pulse will have changed states at least once, and some twice. Using a bipolar row pulse as illustrated in FIG. 11, effective charge balancing is produced without rewriting the same frame data using opposite polarities as previously described. It will be appreciated however, that the line time allocated for each row write with a bipolar pulse could be twice as long as unipolar row pulse drive schemes.

Frame N+1 is written in accordance with the third row of FIG. 4. for Frame N+1, the scan voltage is −5 V, and the column voltage is set to +5 V to actuate, and −5 V to relax. The row pulse for Frame N+1 also has two portions, each at a different voltage level. Here, a first portion 102 is at +5 V and a second portion 102 is at −5 V, again each of approximately the same duration. The application of such a row pulse will have a similar but opposite effect as the row pulse shown for Frame N. For example, if an asserted column voltage for Frame N+1 is +5 V, the first portion 102 will cause the interferometric modulator to relax (or remain in the same state if it is already relaxed), and the second portion will cause it to actuate. Alternatively, if an asserted column voltage for Frame N+1 is −5 V, the first portion 102 will cause the interferometric modulator to actuate (or remain in an actuated state) and the second portion will cause it to relax. As the display is continually refreshed and/or updated, the polarity can be alternated between frames, with Frame N+2 being written in the same manner as Frame N, Frame N+3 written in the same manner as Frame N+1, and so on.

Figure 12:
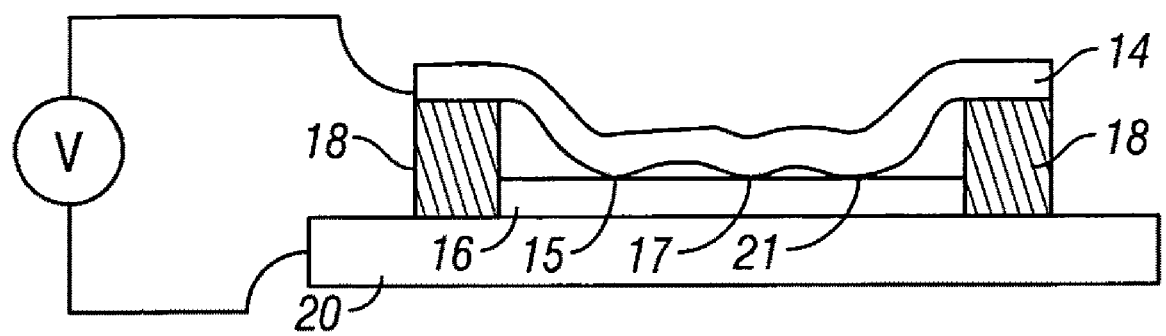
FIG. 12 is a cross section of an actuated interferometric modulator illustrating a stuck movable reflective layer.

FIG. 12 illustrates another adverse condition that can occur when the interferometric modulator is actuated. Although the state of the modulators can change rapidly if the information being displayed in a region of an array is dynamic, one or more modulators can remain in the same state for an indefinite period of time if the information displayed in a region of an array does not change, for example, during the constant display of an icon. In particular, such a condition can occur when the movable reflective layer 14 remains in an actuated state for a relatively long period of time without being toggled to a relaxed state. Such a condition can also occur when an interferometric modulator is frequently actuated using the same polarity over a relatively short time period. In FIG. 12, the movable reflective layer 14 is illustrated in an actuated state. In some circumstances, the movable reflective layer 14 can become stuck to the dielectric layer 16 at one or more contact points 15, 17, 21.

To ensure modulators remain available to be switched into the desired state, a voltage pulse can be applied to "shake" a modulator. This shaking rapidly flexes and/or moves the movable reflective layer such that if stuck it may become released. In one embodiment, the array controller can assert one or more voltage pulses having a large voltage, e.g., higher than the normal operational voltage. In some embodiments, if the resonant frequency of the modulator is known, the frequency of the pulse can be generated at the resonant frequency of the modulator. In another embodiment, the electronics can be designed to handle pulses of one or more resonant frequencies, and these frequencies can be used to shake the device. For example, if the activation voltage is normally 10 V, a bipolar square wave of 20 V peak (40 V peak-to-peak) at 100 kHz-1 MHz can be applied across the device. Shaking can be set to occur at the startup or shutdown of the device, or at another predetermined (e.g., periodically) or dynamically determined time. In some embodiments, shaking can be performed during the operation of the device as triggered either by the user, an automatic timing process or by a condition in the MEMS device itself, such as a diagnostic condition. In some embodiments, shaking can be used to clear the device, e.g., setting all or a portion of the modulators in a desired state.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As one example, it will be appreciated that the test voltage driver circuitry could be separate from the array driver circuitry used to create the display. As with current sensors, separate voltage sensors could be dedicated to separate row electrodes. The scope of the invention is indicated by the appended claims rather than by the foregoing description. All changes which come within the meaning and range of equivalency of the claims are to be embraced within their scope.

The invention claimed is:

1. A method of operating a MEMS display element, said MEMS display element displaying bistability arising from a hysteresis curve having actuation and relaxation portions, said method comprising:
   producing a shift of said hysteresis curve by applying a series of actuation voltages to said MEMS display element during operation of a display incorporating said MEMS display element; and
   applying a restoring voltage to said MEMS display element, said restoring voltage having a magnitude larger than said series of actuation voltages and being sufficient to reduce said shift of said hysteresis curve.

2. The method of claim 1, wherein said restoring voltage comprises a large amplitude positive potential followed by a large amplitude negative potential.

3. The method of claim 1, wherein said restoring voltage comprises a large amplitude negative potential followed by a large amplitude positive potential.

4. The method of claim 1, wherein said restoring voltage comprises an AC waveform toggling between a large amplitude positive potential and a large amplitude negative potential.

5. The method of claim 1, wherein said MEMS display element comprises an interferometric modulator.

6. The method of claim 1, wherein said restoring voltage is more than about 1.25 times the potential of said series of actuation potentials.

7. The method of claim 1, wherein said restoring voltage is more than about 1.5 times the potential of said series of actuation potentials.

8. The method of claim 1, wherein said restoring voltage is more than about 2.0 times the potential of said series of actuation potentials.

9. The method of claim 1, wherein said restoring voltage has a polarity opposite to a pre-existing charge buildup.

10. The method of claim 1, wherein said applying is performed at predetermined times.

11. A display apparatus, comprising:
    at least one MEMS display element displaying bistability arising from a hysteresis curve having actuation and relaxation portions; and
    an array controller is operable for producing a shift of said hysteresis curve by:
        applying a series of actuation voltages to said MEMS display element during operation of a display incorporating said MEMS display element; and
        applying a restoring voltage to said MEMS display element, said restoring voltage having a magnitude larger than said series of actuation voltages and being sufficient to reduce said shift of said hysteresis curve.

12. The apparatus of claim 11, wherein said restoring voltage comprises a large amplitude positive potential followed by a large amplitude negative potential.

13. The apparatus of claim 11, wherein said restoring voltage comprises a large amplitude negative potential followed by a large amplitude positive potential.

14. The apparatus of claim 11, wherein said restoring voltage comprises an AC waveform toggling between a large positive potential and a large negative potential.

15. The apparatus of claim 11, wherein said MEMS display element comprises an interferometric modulator.

16. The apparatus of claim 11, wherein said restoring voltage is more than about 1.25 times the potential of said series of actuation potentials.

17. The apparatus of claim 11, wherein said restoring voltage is more than about 1.5 times the potential of said series of actuation potentials.

18. The apparatus of claim 11, wherein said restoring voltage is more than about 2.0 times the potential of said series of actuation potentials.

19. The apparatus of claim 11, wherein said restoring voltage has a polarity opposite to a pre-existing charge buildup.

20. The apparatus of claim 11, wherein said applying is performed at predetermined times.

21. The apparatus of claim 11, further comprising:
    a display comprising said at least one MEMS display element;
    a processor that is in electrical communication with said display, said processor being configured to process image data; and
    a memory device in electrical communication with said processor.

22. The apparatus of claim 21, further comprising:
    a first controller configured to send at least one signal to said display; and
    a second controller configured to send at least a portion of said image data to said first controller.

23. The apparatus of claim 21, further comprising an image source module configured to send said image data to said processor.

24. The apparatus of claim 23, wherein said image source module comprises at least one of a receiver, transceiver, and transmitter.

25. The apparatus of claim 21, further comprising an input device configured to receive input data and to communicate said input data to said processor.

26. A display apparatus comprising:
    means for modulating light in a display, said modulating means displaying bistability arising from a hysteresis curve having actuation and relaxation portions;

means for applying a series of actuation voltages to said modulating means to produce a shift of said hysteresis curve during operation of said display incorporating said modulating means; and means for applying a restoring voltage to said modulating means, said restoring voltage having a magnitude larger than said series of actuation voltages and being sufficient to reduce said shift of said hysteresis curve.

27. The apparatus of claim 26, wherein said modulating means comprises at least one MEMS display element.

28. The apparatus of claim 26, wherein said applying a series of actuation voltages means comprises an array controller.

29. The apparatus of claim 26, wherein said applying a restoring voltage means comprises an array controller.

* * * * *